United States Patent

Stratienko

[15] 3,638,974
[45] Feb. 1, 1972

[54] MECHANICAL ROTARY SELF-INTERLOCKING DEVICE

[72] Inventor: Andrew Stratienko, 8503 Elliston Drive, Philadelphia, Pa. 19118

[22] Filed: Apr. 1, 1971

[21] Appl. No.: 130,390

[52] U.S. Cl. ...................................................287/52.06
[51] Int. Cl. .................................................F16d 1/06
[58] Field of Search ...............287/52.06, 52.04, 52, 52.09

[56] References Cited

UNITED STATES PATENTS 3,404,908  10/1968  Palmer..............................287/52.06
3,501,183  3/1970  Stratienko........................287/52.06

*Primary Examiner*—Andrew V. Kundrat
*Attorney*—Paul & Paul

[57] ABSTRACT

A keyless bushing comprises inner and outer wedge rings and securely holds a hubbed part, such as a gear, pulley, wheel, coupling and the like, on a shaft for transmitting torque and axial thrust. No key or keyway is required on either the hubbed part or the shaft. Calibrated springs preferably conical disc springs, of preselected size and number are provided and are used during the initial installation to avoid overloading and cracking of the hubbed part while at the same time assuring adequate gripping force to obtain the required clamping force between the hubbed part and the shaft.

3 Claims, 6 Drawing Figures

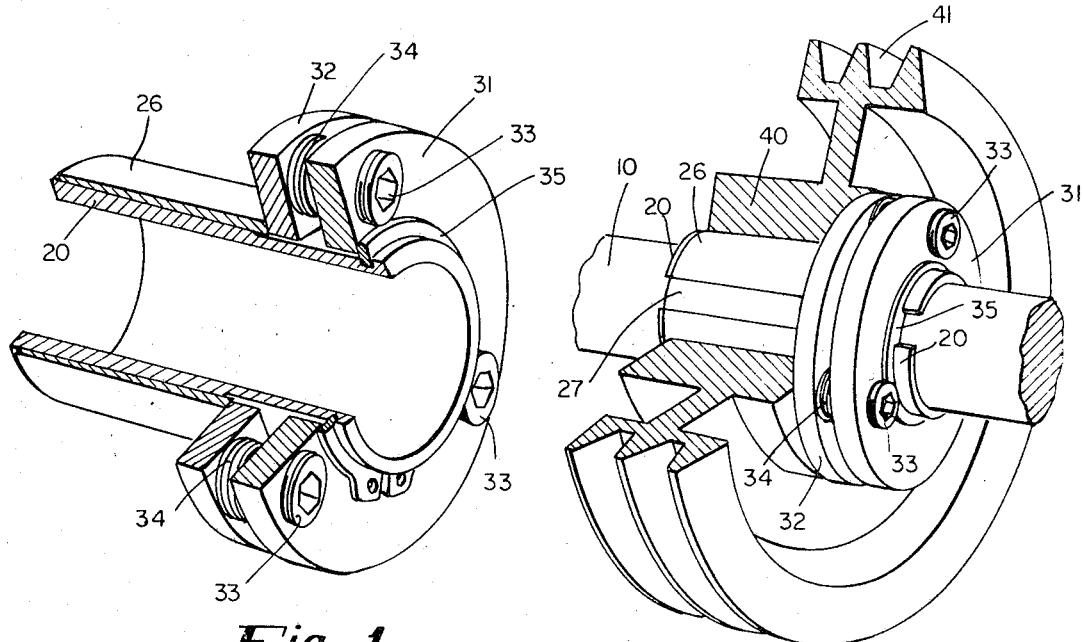
Fig. 1
Fig. 2
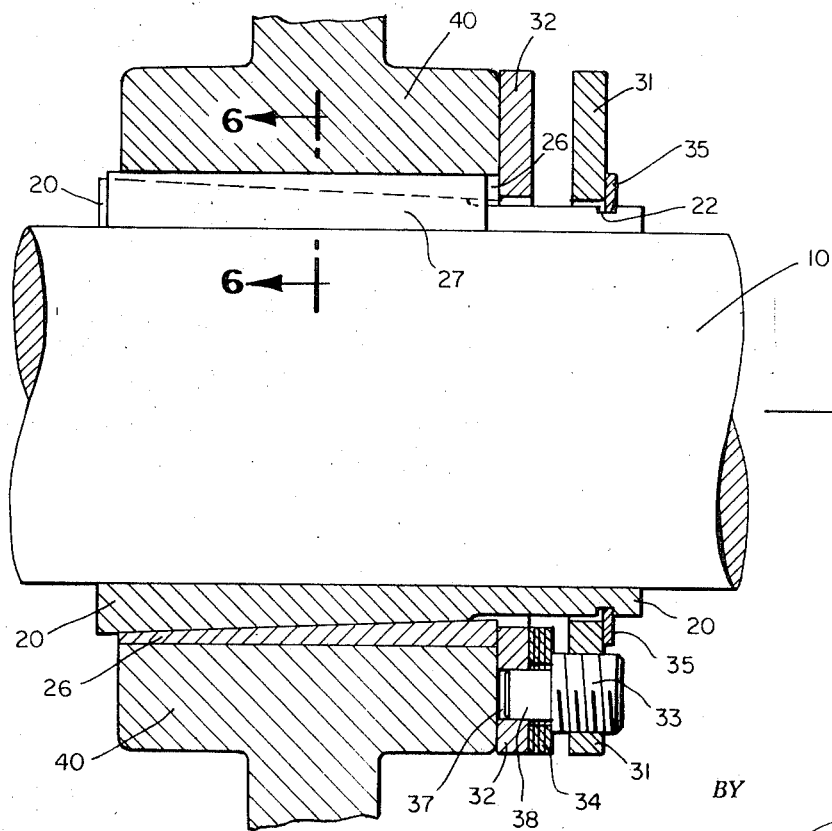
Fig. 4
INVENTOR.
Andrew Stratienko
BY Paul & Paul
ATTORNEYS.

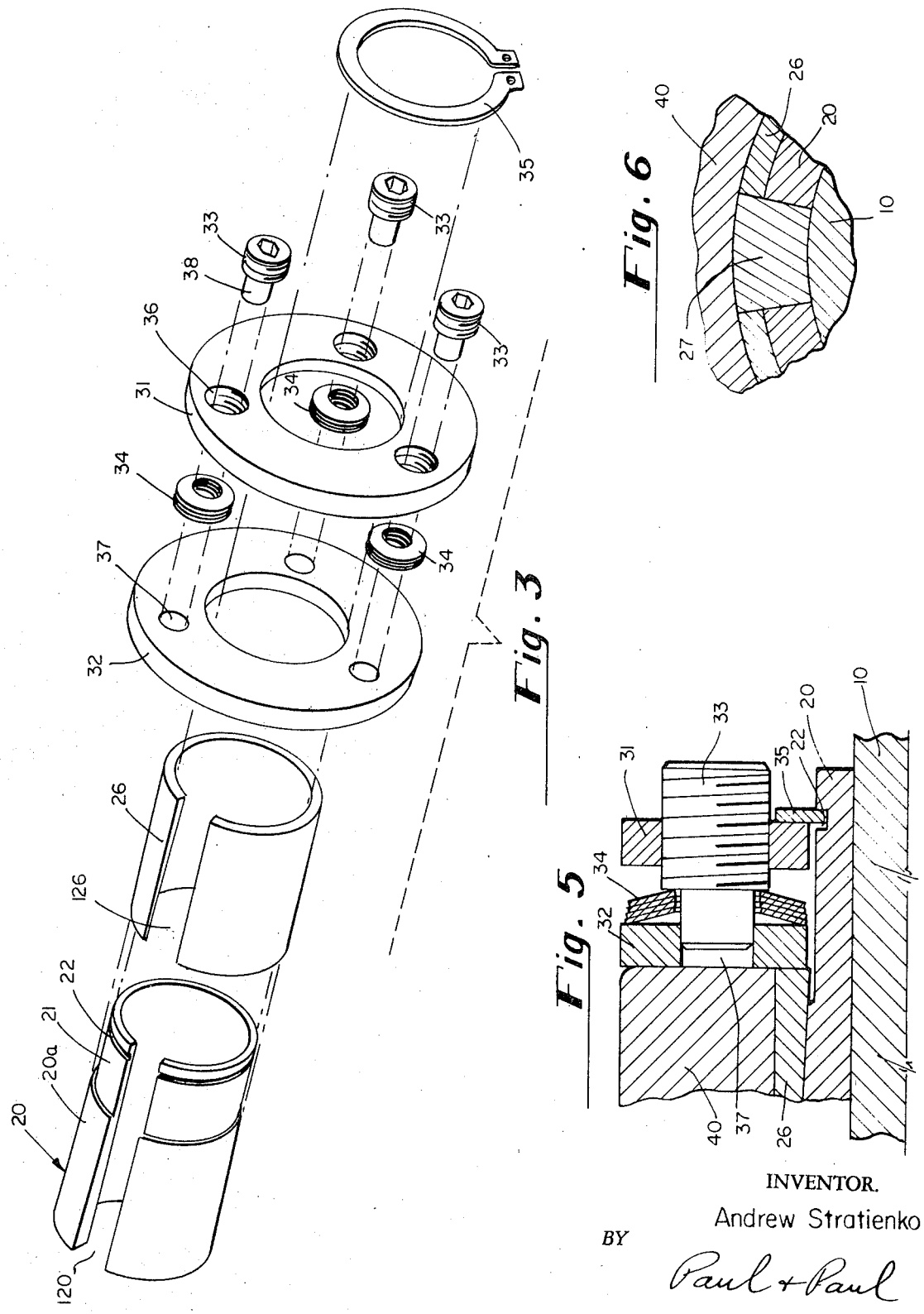

3,638,974

MECHANICAL ROTARY SELF-INTERLOCKING DEVICE

BACKGROUND OF THE INVENTION

The present invention relates to keyless bushings or self-interlocking wedge devices of the types shown in U.S. Pat. No. 3,501,183, issued Mar. 17, 1970, to Andrew Stratienko. The present invention relates particularly to the type of self-interlocking device shown in FIGS. 17, 25, 26, 27, and 28 of the aforesaid patent.

In FIGS. 6 and 7 of the aforesaid patent, two elastic wedge rings are shown for holding a hubbed part on a shaft. The inner wedge ring engages the surface of the shaft at a straight annular surface and the outer wedge ring engages the surface of the hubbed part at a straight annular surface. A nut and washer serve to tighten the hubbed part laterally, and the elastic wedge rings act to hold the hubbed part in place on the shaft.

In FIGS. 16 and 17 of the aforesaid U.S. Pat. No. 3,501,183, pretightening cap screws are used. A nut is positioned with a desired clearance between the retained part and the nut, leaving the cap screws accessible for pretightening by a wrench. In FIG. 17, the cap screws operate on a ring which is retained by a shoulder at the edge of the wedge. In FIG. 17, the wedge elements are flexible, as by being notched or slotted, so as to be able to deform radially inwardly and outwardly. When the cap screw is tightened, the wedge elements grip the shaft and the hubbed device and hold them locked together. To do this, the one wedge element must move laterally relative to the other wedge element while the said other wedge element remains stationary on the shaft. To accomplish this, the coefficient of starting friction of the wedge on the straight surface must be related to the frictional angle of the inclined surface with respect to the direction of motion. This is described in detail in the aforesaid U.S. Pat. No. 3,501,183.

SUMMARY OF THE INVENTION

The principal object of the present invention is to provide a modified keyless bushing or self-interlocking device of the type shown in U.S. Pat. No. 3,501,183, modified to provide against overloading and possible cracking of the hub or shaft at the time of initial installation, while nevertheless providing adequate gripping force between the hub and the shaft.

The foregoing object is achieved by providing sets of springs, preferably conical disc springs, of calibrated preselected size and number and then, by means of the wedge rings, translating the rated axial thrust of the springs into a radial gripping force which is equal to many times the thrust force.

BRIEF DESCRIPTION OF THE DRAWINGS

FIG. 1 is a perspective view, cut away to show more clearly the inner and outer wedge rings, the thrust and loading collars, and the conical disc springs;

FIG. 2 is a perspective view, cut away and showing a hubbed pulley secured to a shaft by the wedge ring bushing device of the present invention;

FIG. 3 is an exploded view showing the various parts which comprise the wedge ring bushing device;

FIG. 4 is a sectional view showing the wedge ring bushing device on a shaft;

FIG. 5 is a view in section showing details of the conical disc springs and loading screw;

FIG. 6 is a view in section showing the wedge ring rotational stop.

DETAILED DESCRIPTION OF THE PREFERRED EMBODIMENTS

Reference will first be made to FIG. 3. In FIG. 3 an exploded view is shown of the various component parts of the wedge ring bushing device of the present invention. The parts are shown positioned on an axis which is the center axis of a shaft, not shown, on which a hubbed part is to be mounted.

The component part at extreme left of FIG. 3 is the split inner wedge ring 20. This ring has a straight inner surface, an inclined outer surface 20a at the right end portion. The right flat portion 21 has a circumferential groove 22 near the end.

The second from the left component part shown in FIG. 3 is the split outer wedge ring 26. This ring 26 has a straight outer surface and an inclined inner surface throughout its entire length. The outer and inner wedge rings 26 and 20 have related diametral dimensions, and the angles of inclination of the respective wedge surfaces are small (of the order of 3°). The outer wedge ring is fitted with a sliding fit over the inclined portion 20a of the inner wedge ring 20. Both the outer and the inner wedge rings are split in the axial direction, as at 126 and 120, respectively. This allows the wedge rings to be expanded and contracted radially in response to forces applied. Wedge rings 20 and 26 may be formed out of tubular steel modified to put on the taper.

The third component part shown in FIG. 3 is the thrust collar 32. This is an annular structure having holes 37 for receiving the shanks of loading screws 33. The fourth part illustrated in FIG. 3 are three sets of conical disc springs 34. It will be understood that some other member of sets of springs may be used. The fifth part is the loading collar 31. This collar 31 is provided with tapped holes 36 for receiving the threaded loading screws 33, which are shown as the sixth part. The three sets of conical disc springs 34 are positioned between the loading collar 31 and the thrust collar 32. Each set is illustrated as having four discs, but this number is not fixed and will vary with need. The discs are supported on the nonthreaded shanks of the loading screws 33. The seventh or rightmost item shown in FIG. 3 is the split retaining ring 35 which fits into groove 22 and is used to retain the loading collar 31.

The manner in which the component parts of the device shown in FIG. 3 are assembled together to hold securely a hubbed device, such as pulley 41, on the shaft 10 is illustrated in FIGS. 1, 2, 4, 5 and 6. The split inner wedge ring 20 is first slipped on to the shaft 10. Then the split outer wedge ring 26 is slidingly fitted over the inclined portion 20a of the inner wedge ring 20, the sliding movement being from right to left as viewed in FIGS. 1, 2 and 4. To facilitate this sliding fit, the outer surface 20a of the inner wedge ring 20 is preferably provided with a coating of low frictional material, which may preferably be Teflon (polytetrafluoroethylene) bonded onto the surface of the metal. Such material has a coefficient of friction of the order of 0.05.

The use of such low frictional coating allows considerable reduction in wedge angle while maintaining the self-releasing feature. This feature is discussed fully in the U.S. Pat. No. 3,501,183.

Next, the thrust collar 32 is slipped over the projecting portion 21 of the inner wedge ring 20 and into abutting relation with the right end of the outer wedge ring 26. Then the loading collar 31 is slipped over the projecting end portion 21 of the inner wedge ring 20 in spaced relation to the thrust collar 32. The three loading screws 33 are threaded into the tap holes 36 and the sets of conical disc springs 34 are slipped over the nonthreaded shank portions 38 of the screws 33 before the shank portions 38 enter into the holes 37 of the thrust collar 32. Finally, the split retaining ring 35 is placed over the end of the inner wedge 20 and received into the groove 22.

For a particular installation, the number and size of the calibrated conical disc springs 34 are chosen to require a preselected thrust force to straighten out the discs. In the illustration, four discs are shown in each set at each of three positions. If, for example, each disc requires a thrust force of 10 pounds to straighten it, then a thrust force of 40 pounds is required to straighten the four discs of one set, and a total thrust force of 120 pounds would be required to straighten the three sets of discs. In a typical case, the slope of the wedge rings 20 and 26 would be of the order of 3° (tangent =0.05) and the friction coefficient approximately 0.05 and in such case the axial thrust force on the discs 34 and on the thrust collar 32 is converted into a radial force of 1/0.1 or 10 times the axial thrust force, which in the present example, would be 10 times 120 pounds, or a radial force of 1,200 pounds, which produces gripping force between the hub and the shaft.

It will be seen from FIGS. 2, 4 and 5, that as the loading screws 33 are tightened, the discs of the sets of conical disc springs 34 press against the thrust collar 32 which in turn presses against the side of the hub 40 or the edge of the outer wedge ring 26. This thrust force causes the hub 40 and the wedge ring 26 to move together, to the left as viewed in the drawings. Due to a low coefficient of friction (of the order of 0.05) and to low angle of inclination of the mating surfaces of the wedges 20 and 26 (of the order of 3°), the outer wedge 26 and hub 40 move relative to the inner wedge 20 without causing any movement of the inner wedge 20 on the shaft 10. Movement of the outer wedge 26 on the inner wedge 20 continues until the reaction or back force equals the straightening force of the conical disc springs, at which time the discs straighten from their conical form, illustrated in FIG. 5, to the flat or straightened form illustrated in FIG. 4. This change will be visible and felt instantly by the installer, since resistance to his tightening of the screws 33 suddenly increases, and accordingly, the operator discontinues tightening the screws 33.

The fact that the wedge rings 20 and 26 as at 120 and 126, are split, allows the wedge rings to change dimensions in the radial direction. Thus, when the loading screws 33 are tightened to apply an axial force, the hub 40 and the outer wedge ring 26 are pushed to the left by the thrust collar 32. The outer wedge ring 26 slides easily on the antifriction surface of the inner wedge ring 20 and in so doing is forced to expand and is wedged into the annular space between the hub 40 and the inner ring 20. Simultaneously the inner ring 20 contracts on the shaft 10. The relatively low axial force is converted (using the antifriction coating and the small wedge angle of the wedge rings 20 and 26) into high radial force and high gripping power, and, accordingly, the inner wedge ring 20 grips tightly the shaft 10, and the outer wedge ring 26 grips tightly the hub 40 of the pulley 41. In this manner, the pulley 41 is tightly secured to the shaft 10 so that torque forces imparted to one of them are transmitted to the other with no slippage. Of particular importance is the fact that overstressing of the shaft and/or hub at assembly is prevented by the calibrated conical disc springs, the loading screws being tightened only until the disc springs reach solid height.

To prevent any possibility of rotational shifting of one of the wedge rings relative to the other on the slippery surfaces, a wedge ring rotational stop 27 may be used. Such a stop is illustrated in FIG. 6, and, while desirable, is not essential to the concept of the present invention.

The bushing described is self-energizing. The combined resistance of the small angle of taper of the wedge rings and the antifriction coating is less than the resistance to axial movement of the inner wedge ring on the shaft. If an axial force acts on the outer ring toward the wedge inclination, the outer ring slides on the inner ring, but the inner ring does not slide on the shaft. The result is more thrust and more gripping power. Thrust capacity in the one direction away from the collars 32 and 31 is limited by the strength of the parts used for the hub mount rather than the gripping ability of the bushing.

It will be seen from the foregoing description, that the present invention is directed to a bushing which is capable of transmitting torque and thrust without need for keyways and tapers in hubs and shafts. The bushing may be used to mount gears, pulleys, wheels, impellers, couplings and other hubbed parts on shafts. Parts are held firmly in place without keys, even under high-torque conditions. Close tolerances are not required for shafts and hub bores, yet, once tightened in place, the bushing provides more torque transmitting capacity than a standard key. Gears, pulleys and other parts can be easily mounted in any angular or axial position on the shaft and will remain locked in place despite severe vibrations, and without fretting corrosion. The bushing is also self-releasing for easy removal or repositioning. Since keyways, tapers, self-turning grooves or threads are not required, significant savings can be realized on machining. Furthermore, there is no weakening of shafts or hubs due to metal removal or stress concentration. Consequently, additional savings can be realized by using smaller diameter shafts.

In the foregoing description of the preferred embodiment, the calibrated springs have been illustrated and described as being of the conical disc type but it is to be understood that other forms of springs, such as coil springs, leaf springs, and others, may be used. The important feature is the selection of calibrated springs which, when a given axial thrust force is applied, become solid, thereby giving a signal which is instantly recognized by the operator, and he thereupon discontinues tightening the loading screws.

What is claimed is:

1. A linear self-interlocking wedge bushing for securing a device having a circular cross section opening to a circular cross section shaft or other cylindrical member, the diameter of such shaft or other cylindrical member being smaller than the diameter of the opening of said device forming therebetween an annular space for receiving said bushing, said bushing comprising:
   a. an inner wedge ring having an inner surface axially straight for engaging said shaft and an outer surface inclined in the axial direction;
   b. an outer wedge ring having an outer surface axially straight for engaging the inner surface of said device with circular opening and an inner surface inclined in the axial direction for engaging the inclined surface of said inner wedge ring;
   c. said inner and outer wedge rings being concentrically disposed relative to each other;
   d. said inner and outer wedge rings being radially expandable and contractable;
   e. said inner wedge ring having a portion which projects axially beyond said outer wedge ring;
   f. a thrust collar slidingly fitted on the projecting portion of said inner wedge ring and adapted to abut against the edge of said outer wedge ring;
   g. a loading collar slidingly fitted on said projecting portion and spaced from said thrust collar;
   h. retaining means for retaining said loading collar against axial movement in a direction away from said thrust collar;
   i. springs disposed between said thrust collar and loading collar, said springs abutting against said thrust collar;
   j. loading screws threaded in said loading collar, said screws adapted when tightened to urge said springs against said thrust collar;
   k. said springs being designed to become compressed solidly in response to a preselected axial thrust force which is translated by said wedge rings into a radial force insufficient to damage said annular device and/or said shaft.

2. Apparatus according to claim 1 characterized in that said inner and outer wedge rings are split, forming slots therein.

3. Apparatus according to claim 2 characterized in that said slots are in registry with each other, and in that a bar is inserted therein to function as a wedge ring rotational stop to prevent rotational movement of said wedge rings relative to each other.

* * * * *